United States Patent
Cai et al.

(10) Patent No.: US 6,590,970 B1
(45) Date of Patent: Jul. 8, 2003

(54) INTELLIGENT-NETWORKED TELEPHONE SYSTEM HAVING ADVERTISEMENT WITH BONUS FREE PHONE CALL SERVICE

(75) Inventors: Yigang Cai, Naperville, IL (US); Shiyan Hua, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/346,153

(22) Filed: Jul. 9, 1999

(51) Int. Cl.$^7$ ................................................ H04M 7/00
(52) U.S. Cl. ................................ 379/221.11; 379/88.18
(58) Field of Search ....................... 379/221.08, 221.11, 379/221.09, 88.18, 88.22, 88.25

(56) References Cited

U.S. PATENT DOCUMENTS 4,757,267 A * 7/1988 Riskin ...................... 379/113
5,572,583 A * 11/1996 Wheeler, Jr. et al. ...... 379/112 X

* cited by examiner

Primary Examiner—Creighton Smith

(57) ABSTRACT

An intelligent-networked telecommunications system allows a customer to make a free telephone call after listening to a product or service advertisement. The customer reaches a product/service menu after dialing a telephone number with a special prefix reserved for Advertisement With Bonus Call (AWBC) service. The customer then chooses the advertisement of interest. After listening to the advertisement, the system allows the customer to enter a destination number for a free bonus telephone call. In the preferred embodiment, the bonus call is limited to a predefined duration monitored by a timer reset at the beginning of the bonus call. When the time limit is near, the system broadcasts this fact to both the calling party and the called party. At the expiration of the time limit, the call is automatically disconnected, and the customer can be returned to the AWBC product/service main menu. Charging the bonus call to the sponsor of the product/service advertisement to which the customer has listened completes the transaction.

16 Claims, 3 Drawing Sheets

1. AChBillingChargingCharateristic Parameter

The aChBillingChargingCharateristic parameter of ApplyCharging operation for AWBC service should include following information defined in ASN.1:

```
AChBillingChargingCharateristic ::= IMPLICIT SEQUENCE{
        chargePartyNumber [0] originalCalledPartyID  -- translated AWBC number --
        bonusAwarded [1] CHOICE {
                costAwarded [0] INTEGER  -- in local currency --
                timeAwarded [1] INTEGER  -- in minute --}
        warningBeforeLimit [2] IMPLICIT SEQUENCE {
                amountBeforeLimit [0] CHOICE {
                        costBeforeLimit [0] INTEGER  -- in local currency --
                        timeBeforeLimit [1] INTEGER  -- in minute --}
                warningIndicator [1] InformationToSend} OPTIONAL
        answerIndicator [3] INTEGER OPTIONAL}
```

2. CallResult Parameter

The callResult parameter of ApplyChargingReport operation for AWBC service should include following information defined in ASN.1:

```
CallResult ::= IMPLICIT SEQUENCE{
        ServiceKey [0] INTEGER
        chargePartyNumber [1] originalCalledPartyID  -- translated AWBC number --
        callingPartyNumber [2] OCTET STRING OPTIONAL
        calledPartyNumber [3] OCTET STRING OPTIONAL
        startDateAndTime [4] OCTET STRING (SIZE (8)) OPTIONAL
                -- in format of YYYYMMDDHHMMSS with each digit coded BCD --
        stopDateAndTime [5] OCTET STRING (SIZE (8)) OPTIONAL
                -- in format of YYYYMMDDHHMMSS with each digit coded BCD --
        duration [6] OCTET STRING (SIZE (4)) OPTIONAL
                -- in format of HHMMSS with each digit coded BCD --
        callCost [7] INTEGER OPTIONAL}
```

FIGURE 3

INTELLIGENT-NETWORKED TELEPHONE SYSTEM HAVING ADVERTISEMENT WITH BONUS FREE PHONE CALL SERVICE

BACKGROUND OF THE INVENTION

1. Field of the Invention

The present invention generally relates to networks for providing telephone services. More particularly, the present invention relates to the creation of automated marketing opportunities through intelligent-networked public telephone systems.

2. Background

Intelligent Networks (INs) are software and hardware hybrids which can be used to automatically process telephone calls in a telephone system. Besides routinely routing calls from a calling party to a called party/destination number, an IN may also be adapted to handle various pre-paid and post-paid calling card transactions, as well as non-calling card transactions.

A service control point (SCP) in the IN provides the logic that governs call-handling, etc., and contains a database that stores useful information needed for various transactions. The IN also contains several switches for both receiving calls to the network and physically routing calls to destination numbers. Each switch contains a Service Switching Point (SSP) for interfacing with calling parties and performing the actual call routing under the instruction of the SCP. The SCP and SSP may be connected with a high-speed link utilizing, for example, the Intelligent Network Application Protocol (INAP), as approved by the European Telecommunications Standards Institute (ETSI) and International Telecommunication Unit (ITU).

Of great interest is how the speed, precision and automatism of the IN can be leveraged in intelligent-networked public telephone systems to provide new, efficient marketing opportunities for businesses targeting telephone customers.

SUMMARY OF THE INVENTION

In view of the previously-defined marketing goals, the present invention provides a telecommunications system for processing telephone calls at least including:

- a plurality of input telephonic devices operatively coupled to an origination telephone line for initiating telephone calls;
- an automated intelligent network (IN) coupled to origination telephone lines adapted to process telephone calls, the IN at least including a service control point (SCP), and the SCP at least including an SCP control unit and an SCP database coupled to the SCP control unit, the IN being adapted to authorize the routing of telephone calls;
- at least one switch operatively coupled to the origination telephone line and to the SCP, the switch adapted to route calls authorized by the SCP to a destination number specified by the customer; and
- an intelligent peripheral (IP) adapted to store a pre-recorded product/service menu and advertisements allowing a customer to designate a product or service advertisement to which the customer can listen;
- wherein the SCP is adapted is route a customer bonus call to a destination number specified by the customer after the customer listens to a product/service advertisement.

The present invention also provides, in a telecommunications system, a method for processing telephone calls at least including the steps of:

- providing a plurality of input telephonic devices operatively coupled to an origination telephone line for initiating telephone calls;
- providing an automated intelligent network (IN) coupled to origination telephone lines adapted to process telephone calls, the IN at least including a service control point (SCP), and the SCP at least including an SCP control unit and an SCP database coupled to the SCP control unit, the IN authorizing the routing of telephone calls;
- providing at least one switch operatively coupled to the origination telephone line and to the SCP, the switch routing calls authorized by the SCP to a destination number specified by the customer;
- via an intelligent peripheral (IP), storing a pre-recorded product/service menu and advertisements allowing a customer to designate a product or service advertisement to which the customer can listen; and
- via the SCP, routing a customer bonus call to a destination number specified by the customer after the customer listens to a product/service advertisement.

BRIEF DESCRIPTION OF THE DRAWING FIGURES

Features and advantages of the present invention will become apparent to those skilled in the art from the description below, with reference to the following drawing figures, in which:

FIG. 3 detail the "AchBillingChargingCharacteristic" and "CallResult" parameters of the present invention.

DESCRIPTION OF THE PREFERRED EMBODIMENTS

1. General Description

Figure 1:
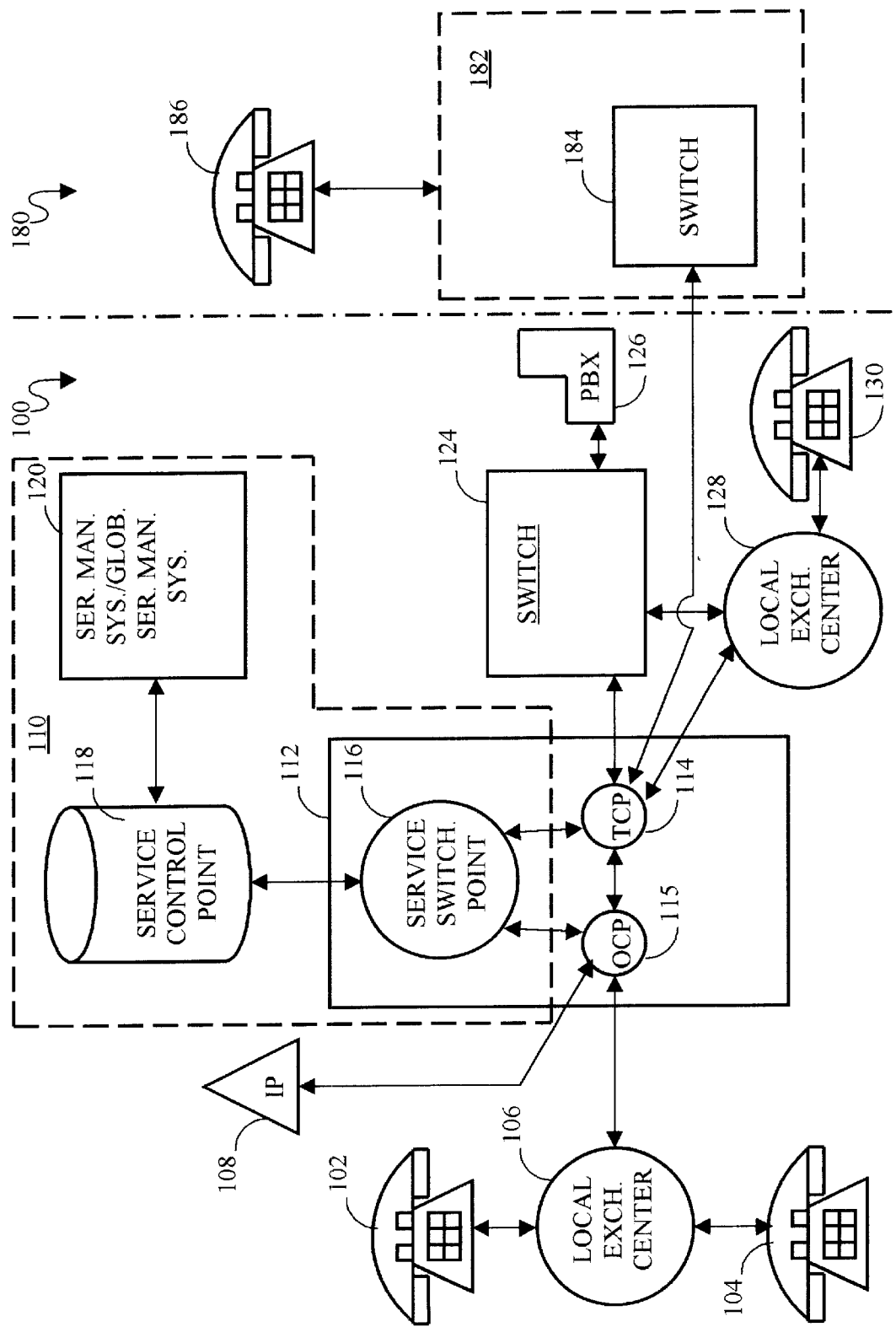
FIG. 1 is a schematic block diagram of the basic hardware for the present-inventive telecommunications system having Advertisement With Bonus Call (AWBC) service.

The basic hardware of the telephone service system 100/180 is illustrated in FIG. 1.

The system 100/180 combines a domestic network 100, as in the United States, for example, and a foreign network 180, as in Europe, for example. The system 100/180 includes a variety of telephonic input devices as would be common in a general telephone system. For example, a user can connect to the network 100 using such devices as common telephones 102 and 104. As an example, a user can attempt to complete a telephone call using a telephone which is part of a private branch exchange (PBX) as is known in the art. The telephones include alphanumeric keypads for inputting Dual-Tone-Multi-Frequency (DTMF) signals, or the like, as is common.

Local exchange centers (LECs) such as the one 106 handle all initial calls, and route calls to a switch 112 when a service access code (SAC) is received from the user. The access number indicates to the LEC that the user desires to place a call through the network 100/180.

An Originating Call Processor (OCP) 115 within the switch 112 transfers the call to a service switching point (SSP) 116. The SSP is part of an intelligent network (IN) 110, capable of automated processing of telephone calls. A Terminating Call Processor (TCP) 114 handles the termination of call processing once a call has been connected to the destination number.

The SSP 116 is linked to a service control point (SCP) 118. The SCP 118 performs service logic and provides the SSP 116 with call handling instructions, as provisioned by the system. It will be appreciated by those skilled in the art that the SCP 118 can be implemented as a networked database, not limited to one geographic location.

A switch 124 that may include an SSP will route an approved telephone call to its final destination as mentioned above.

An intelligent peripheral (IP) 108 is linked to the switch to play announcements (advertisement and prompt menu) and prompt and collect a customer's input information according to instructions sent by the SCP. In an alternate embodiment, the IP can be integrated into one of the switches.

The interface between the SSP 116 and the SCP 118 uses the ETSI/INAP or ITU/INAP protocol for speed and compatibility. The interface between the SSP 116 and the OCP 115, and the interface between the SSP and TCP use a switch internal message flow, or a common channel signaling link or any type of protocols, as will be appreciated by those skilled in the art.

2. AWBC Operation

Figure 2:
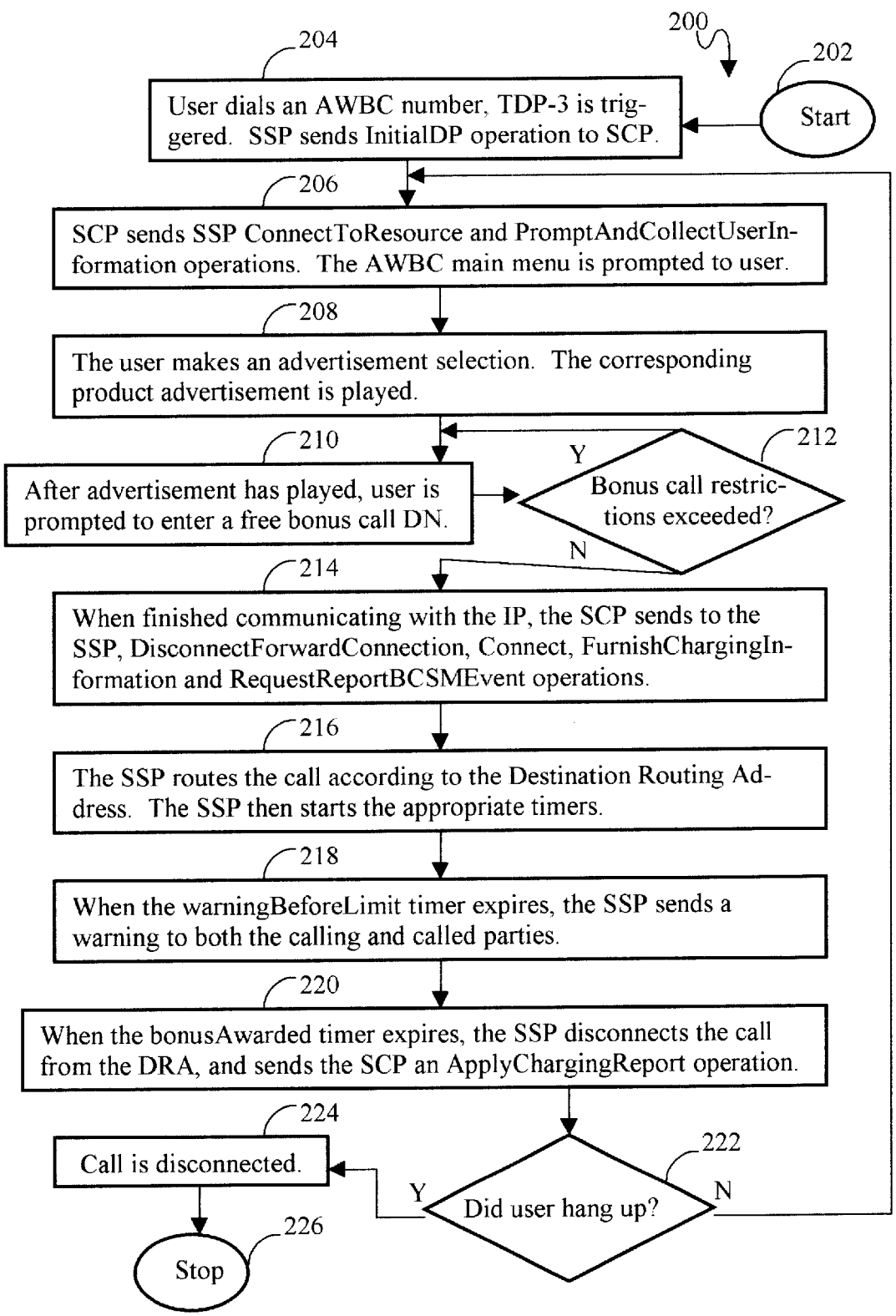
FIG. 2 is a flowchart/algorithm detailing the call flow of the AWBC service.

The algorithm 200 in FIG. 2 details the call flow of an AWBC operation. The AWBC service has one or more sponsors associated with a group of audible advertisements to be played over the telephone. The advertisements are accessible by choosing from a menu prompted when a customer dials an access number. After the customer fully listens to the advertisement of choice, he/she is allowed to make a free bonus call by entering a destination number. In the preferred embodiment, the bonus call lasts for a predetermined duration determined by the sponsoring entity. When expiration of the allotted time is soon to occur the customer and destination party are both warned of the upcoming expiration, so that the call can be completed without disconnection. The call is disconnected upon the expiration of the predetermined duration. The sponsor of the advertisement to which the customer has listened is then billed for the bonus call.

Marketers/sponsors using the AWBC service can update advertisements, account information, and bonus call parameters through a service management system (SMS) or global service management system (GSMS) 120 shown in FIG. 1. A sponsor can connect to the SMS/GMS 120 through various means, including direct telephone connection, or by using a computer and Transmission Control Protocol/Internet Protocol (TCP/IP), a networking protocol.

A special telephone number prefix is reserved to designate AWBC transactions—"808" in the preferred embodiment. When a switch receives the 808 prefix a trigger detection point detects the prefix and causes the SSP to send an InitialDP operation to the SCP (Step 204). The InitialDP contains a service key and the called party number. In response to the InitialDP operation, the SCP sends Connect-ToResource and PromptAndCollectUserInformation operations to the SSP (Step 206). This is followed by the SSP and IP prompting the user with an AWBC main menu.

The AWBC main menu prompts the customer with a detailed message such as the following: "To listen to the advertisement for product 1, press '1.' This advertisement lasts minutes. After listening, you will be awarded minutes of a free local phone call; To listen to the advertisement for product 2, press '2.' This advertisement lasts minutes. After listening, you will be awarded minutes of a free domestic long-distance phone call; To listen to the advertisement for product 3, press '3.' This advertisement lasts minutes. After listening, you will be awarded minutes of a free international long-distance phone call; If you would like to listen to the available selections again, press '4;' If you would like to exit this call, press '5' or hang up."

In Step 208 the advertisement is chosen by the customer and played. After the advertisement of choice is played, the customer is prompted to enter a destination number (DN) for a free bonus call (Step 210). The system determines whether the destination number is one allowed for the advertisement played in Step 212. For example, a customer entitled to a free domestic long-distance call cannot make a free international long-distance call. A destination number exceeding the bonus call restrictions sends the algorithm back to Step 210 to re-prompt the customer for another destination number, along with a message such as "Your free bonus call is limited to __calls, Please enter another telephone number."

In Step 214 the SCP sends the following operations to the SSP of the switch communicating with the customer. A DisconnectForwardConnection operation disconnects the customer from the IP. A Connect operation includes a destination routing address that the SSP uses to route the customer to the destination number. An ApplyCharging or A FurnishChargingInformation operation sends billing information to the switch. The ApplyCharging operation also contains the allowable time for the bonus timer, a warning timer and warning message information. A RequestReport-BCSMEvent operation requests that the SSP report related events to the SCP.

The AChBillingChargingCharateristic parameter of the ApplyCharging operation for AWBC service could include following information defined in ASN. 1 (also shown in FIG. 3):

```
AchBillingChargingCharateristic:: = IMPLICIT SEQUENCE{
    chargePartyNumber [0] originalCalledPartyID --
    translated AWBC number --
    bonusAwarded [1] CHOICE{
        costAwarded [1] INTEGER -- in local currency --
        timeAwarded [1] INTEGER -- in minute --}
    warningBeforeLimit [2] IMPLICIT SEQUENCE {
        amountBeforeLimit [0] CHOICE{
            costBeforeLimit [0] INTEGER -- in local currency --
            timeBeforeLimit [1] INTEGER -- in minute --}
        warningIndicator [1] InformationToSend} OPTIONAL
    answerIndicator [3] INTEGER OPTIONAL}
```

In Step 216, the SSP routes the bonus call to the destination number according to the destination routing address, and starts one or more bonus call timers, to keep track of the length of the bonus call. In the preferred embodiment, there is a bonus call expiration timer (not shown) and a bonus call expiration warning timer (also not shown). The bonus call expiration warning timer ("warningBeforeLimit") tolls prior to the bonus call expiration timer ("bonusAwarded"). If the bonus call expiration warning timer tolls during the bonus call, a warning message is played for both the customer and the called party, informing them that the free bonus call will soon end (Step 218).

Upon the expiration of the bonus call duration timer, the SSP disconnects the customer from the bonus call destination number and sends the SCP an ApplyChargingReport signal to bill the account of the entity sponsoring the advertisement chosen by the customer (Step 220). The callResult parameter of the ApplyChargingReport operation for AWBC service should include the following information defined in ASN. 1 (also shown in FIG. 3):

```
CallResult:: = IMPLICIT SEQUENCE{
    ServiceKey [0] INTEGER
    chargePartyNumber [1] originalCalledPartyID --
    translated AWBC number -
    callingPartyNumber [2] OCTET STRING OPTIONAL
    calledPartyNumber [3] OCTET STRING OPTIONAL
    startDateAndTime [4] OCTET STRING (SIZE (8)) OPTIONAL
        -- in format of YYYYMMDHHMMSS with each digit
        coded BCD -
    stopDateAndTime [5] OCTET STRING (SIZE (8)) OPTIONAL
        -- in format of YYYYMMDDHHMMSS with each
        digit coded BCD -
    duration [6] OCTET STRING (SIZE (4)) OPTIONAL
        -- in format of HHMMSS with each digit coded BCD -
    callCost [7] INTEGER OPTIONAL}
```

If the customer has hung up, the call is disconnected to end the AWBC episode (Steps 222, 224 and 226). If not, the customer is returned to Step 206 for a replay of the AWBC main menu (Step 222).

Variations and modifications of the present invention are possible, given the above description. However, all variations and modifications which are obvious to those skilled in the art to which the present invention pertains are considered to be within the scope of the protection granted by this Letters Patent.

What is claimed is:

1. A telecommunications system for processing telephone calls comprising:
   a plurality of input telephonic devices operatively coupled to an origination telephone line for initiating telephone calls;
   an automated intelligent network (IN) coupled to origination telephone lines adapted to process telephone calls, said IN comprising a service control point (SCP), and said SCP comprising an SCP control unit and an SCP database coupled to said SCP control unit, said IN being adapted to authorize the routing of telephone calls;
   at least one switch operatively coupled to said origination telephone line and to said SCP, said switch adapted to route calls authorized by said SCP to a destination number specified by said customer; and
   an intelligent peripheral (IP) adapted to store a pre-recorded product/service menu and advertisements allowing a customer to designate a product or service advertisement to which the customer can listen;
   wherein said SCP is adapted is route a customer bonus call to a destination number specified by the customer after the customer listens to a product/service advertisement.

2. The system in claim 1 further comprising a bonus call timer adapted to track the duration of said bonus call, wherein said bonus call is connected for a predefined duration.

3. The system in claim 2 further comprising bonus call termination warning message generator adapted to generate a warning message at least perceivable by the customer when the end of said predefined duration is near.

4. The system in claim 1 wherein said SCP is further adapted to bill said bonus call to the sponsoring entity of the product/service advertisement to which the customer has listened.

5. The system in claim 1 wherein at least one unique telephone number prefix is reserved for reaching said product/service advertisement menus.

6. The system in claim 1 wherein said bonus call is a free local telephone call.

7. The system in claim 1 wherein said bonus call is a free domestic long-distance telephone call.

8. The system in claim 1 wherein said bonus call is a free international long-distance telephone call.

9. In a telecommunications system, a method for processing telephone calls comprising the steps of:
   providing a plurality of input telephonic devices operatively coupled to an origination telephone line for initiating telephone calls;
   providing an automated intelligent network (IN) coupled to origination telephone lines adapted to process telephone calls, said IN comprising a service control point (SCP), and said SCP comprising an SCP control unit and an SCP database coupled to said SCP control unit, said IN authorizing the routing of telephone calls;
   providing at least one switch operatively coupled to said origination telephone line and to said SCP, said switch routing calls authorized by said SCP to a destination number specified by said customer;
   via an intelligent peripheral (IP), storing a pre-recorded product/service menu and advertisements allowing a customer to designate a product or service advertisement to which the customer can listen; and
   via said SCP, routing a customer bonus call to a destination number specified by the customer after the customer listens to a product/service advertisement.

10. The method in claim 9 further comprising the steps of, via a bonus call timer, tracking the duration of said bonus call, and connecting said bonus call for a predefined duration.

11. The method in claim 10 further comprising the step of, via a bonus call termination warning message generator, generating a warning message at least perceivable by the customer when the end of said predefined duration is near.

12. The method in claim 9 further comprising the step of, via said SCP, billing said bonus call to the sponsoring entity of the product/service advertisement to which the customer has listened.

13. The method in claim 9 wherein at least one unique telephone number prefix is reserved for reaching said product/service advertisement menus.

14. The method in claim 9 wherein said bonus call is a free local telephone call.

15. The method in claim 9 wherein said bonus call is a free domestic long-distance telephone call.

16. The method in claim 9 wherein said bonus call is a free international long-distance telephone call.

* * * * *